US007296781B2

(12) United States Patent
Akabane

(10) Patent No.: US 7,296,781 B2
(45) Date of Patent: Nov. 20, 2007

(54) ELECTROMAGNETIC FUEL INJECTION VALVE

(75) Inventor: Akira Akabane, Kakuda (JP)

(73) Assignee: Keihin Corporation, Tokyo (JP)

( * ) Notice: Subject to any disclaimer, the term of this patent is extended or adjusted under 35 U.S.C. 154(b) by 65 days.

(21) Appl. No.: 11/235,551

(22) Filed: Sep. 27, 2005

(65) Prior Publication Data

US 2006/0208109 A1 Sep. 21, 2006

(30) Foreign Application Priority Data

Sep. 27, 2004 (JP) ............................ 2004-280183

(51) Int. Cl.
*F16K 31/02* (2006.01)

(52) U.S. Cl. ............................ 251/129.21; 239/585.1; 335/299

(58) Field of Classification Search ........... 251/129.15, 251/129.21; 239/585.1, 585.2, 585.3, 585.4, 239/585.5; 335/299
See application file for complete search history.

(56) References Cited

U.S. PATENT DOCUMENTS

| | | | | |
|---|---|---|---|---|
| 5,178,362 A * | 1/1993 | Vogt et al. | ............. | 251/129.21 |
| 5,236,174 A * | 8/1993 | Vogt et al. | ............. | 251/129.21 |
| 5,255,855 A * | 10/1993 | Maier et al. | ............. | 239/585.4 |
| 6,317,978 B2 * | 11/2001 | Reiter | ..................... | 29/890.13 |

FOREIGN PATENT DOCUMENTS

| | | |
|---|---|---|
| JP | 55-144759 A | 11/1980 |
| JP | 08-232813 A | 9/1996 |
| JP | 11-247739 A | 9/1999 |
| JP | 2000-249030 A | 9/2000 |
| JP | 2002-021678 A | 1/2002 |
| JP | 2002-081356 A | 3/2002 |
| JP | 2002-089399 A | 3/2002 |
| JP | 2002-276504 A | 9/2002 |
| JP | 2003-120466 A | 4/2003 |
| JP | 2004-76700 A | 3/2004 |

* cited by examiner

*Primary Examiner*—Eric Keasel
*Assistant Examiner*—John K. Fristoe, Jr.
(74) *Attorney, Agent, or Firm*—Arent Fox LLP

(57) ABSTRACT

An electromagnetic fuel injection valve includes a coil assembly housed in a solenoid housing having a cylindrical magnetic metal coil case which integrally has, at one end side, a ring-shaped end wall portion and a press-fit cylindrical portion integrally connected to an inner periphery of the end wall portion so that the magnetic cylindrical body is press-fitted to the press-fit cylindrical portion and the press-fit cylindrical portion is welded to the magnetic cylindrical body, and a flange portion which is provided at a rear end of a fixed core. Wherein at least the solenoid housing is covered with a resin molded part and integrally has a power receiving coupler, the coil case being formed by a burring process to a central portion of a closed end of a bottomed cylindrical material having a circular opening with a smaller diameter than an outer diameter of the press-fit cylindrical portion.

7 Claims, 4 Drawing Sheets

ELECTROMAGNETIC FUEL INJECTION VALVE

BACKGROUND OF THE INVENTION

1. Field of the Invention

The present invention relates to an electromagnetic fuel injection valve, and particularly to an electromagnetic fuel injection valve in which a magnetic cylindrical body which constitutes a part of a valve housing having a valve seat at a front end portion is connected to a front portion of a cylindrical fixed core via a coaxial non-magnetic cylindrical body; a solenoid housing comprises a cylindrical magnetic metal coil case integrally having, at one end side, a ring-shaped end wall portion and a press-fit cylindrical portion integrally connected to an inner periphery of the end wall portion so that the magnetic cylindrical body is press-fitted to the press-fit cylindrical portion and the press-fit cylindrical portion is welded to the magnetic cylindrical body, and a flange portion which protrudes radially outward from a rear end of the fixed core and is magnetically connected to the other end of the coil case; a coil assembly which surrounds a rear portion of the magnetic cylindrical body, the non-magnetic cylindrical body and the fixed core is housed in the solenoid housing; and at least the solenoid housing is covered with a resin molded part made of a synthetic resin and integrally having a power receiving coupler which faces a power-receiving-side connecting terminal connected to a coil of the coil assembly.

2. Description of the Related Art

Such an electromagnetic fuel injection valve is already known from, for example, Japanese Patent Application Laid-open No. 2004-76700 in which a coil case 31 made of magnetic metal is formed as shown in FIG. 4. Specifically, in forming a coil case 31' integrally having, at one end side, a ring-shaped end wall portion 31*a* and a press-fit cylindrical portion 31*b*' connected to an inner periphery of the end wall portion 31*a*, a magnetic-metal bottomed cylindrical material 65 having a dish-shaped projecting portion 65*a* at a central portion of a closed end and is formed of is prepared, and punching is performed by a punch 66 and a die 67 to punch out the central portion of the closed end in the material 65 as shown in FIG. 4(*a*), thereby obtaining the coil case 31' as shown in FIG. 4(*b*).

The press-fit cylindrical portion 31*b*' has a function of exchanging magnetic flux with the magnetic cylindrical body by press-fitting therein the magnetic cylindrical body and being welded to an outer periphery of the magnetic cylindrical body, and needs to secure a predetermined length or more for close contact with the outer periphery of the magnetic cylindrical body. When the coil case 31' is formed by the above described punching, a portion incapable of coming into close contact with the outer surface of the magnetic cylindrical body is generated in a tip end side of the press-fit cylindrical portion 31*b*' over a comparatively long distance L1 due to formation of a shear drop and a fracture surface. In order to secure a contact portion with the outer periphery of the magnetic cylinder over a predetermined length or more, a total length (L1+L2) of the press-fit cylindrical portion 31*b*' becomes large. When the press-fit cylindrical portion 31*b*' becomes long in this way, the resin molded part covering the solenoid housing also becomes long, so that the projecting amount of the valve housing from the resin molded part becomes short. As a result, when the fuel injection valve is mounted to a passage forming member which forms an intake passage, the exposed length of the valve housing to the intake passage side becomes short, unless the electromagnetic fuel injection valve is increased in size, and therefore injected fuel may easily attach to an inner surface of the intake passage.

SUMMARY OF THE INVENTION

The present invention has been achieved in view of the above circumstances, and has an object to provide an electromagnetic fuel injection valve capable of lengthening a projecting amount of a valve housing from a resin molded part while avoiding increase in size.

In order to achieve the above object, according to a first feature of the present invention, there is provided an electromagnetic fuel injection valve in which a magnetic cylindrical body which constitutes a part of a valve housing having a valve seat at a front end portion is connected to a front portion of a cylindrical fixed core via a coaxial non-magnetic cylindrical body; a solenoid housing comprises a cylindrical magnetic metal coil case integrally having, at one end side, a ring-shaped end wall portion and a press-fit cylindrical portion integrally connected to an inner periphery of the end wall portion so that the magnetic cylindrical body is press-fitted to the press-fit cylindrical portion and the press-fit cylindrical portion is welded to the magnetic cylindrical body, and a flange portion which protrudes radially outward from a rear end of the fixed core and is magnetically connected to the other end of the coil case; a coil assembly which surrounds a rear portion of the magnetic cylindrical body, the non-magnetic cylindrical body and the fixed core is housed in the solenoid housing; and at least the solenoid housing is covered with a resin molded part made of a synthetic resin and integrally having a power receiving coupler which faces a power-receiving-side connecting terminal connected to a coil of the coil assembly, characterized in that the coil case is formed by a burring process to a central portion of a closed end of a bottomed cylindrical material having a circular opening with a smaller diameter than an outer diameter of the press-fit cylindrical portion.

With the first feature of the invention, since the coil case is formed by a burring process to a central portion of a closed end of a bottomed cylindrical material having a circular opening with a smaller diameter than an outer diameter of the press-fit cylindrical portion, the press-fit cylindrical portion of the coil case is formed to have a length larger in close contact with the outer surface of the magnetic cylindrical body than that obtained by punching, and the length of the press-fit cylindrical portion can be made shorter than that obtained by punching. Accordingly, the projecting amount of the valve housing from the resin molded part can be made long, and the exposed length of the valve housing to the intake passage side can be made large without increasing the electromagnetic fuel injection valve in size, and attachment of the injection fuel to the inner surface of the intake passage can be suppressed.

According to a second feature of the present invention, in addition to the first feature, the resin molded part is provided with a forward extending portion which extends forward from the solenoid housing while covering the magnetic cylindrical body, and that a tapered projecting portion, which is integrally provided at the resin molded part to cover the magnetic cylindrical body while projecting forward from the inner peripheral portion of the forward extending portion, is inserted between the magnetic cylindrical body and a taper surface which is formed on at least an end portion at the resin molded part side of an inner periphery of a ring-shaped seal ring that is sandwiched between an annular receiving portion provided at a passage forming member forming an intake passage and a front end of the forward extending portion and which surrounds the magnetic cylindrical body.

With the second feature, it is possible to dispose the portion of the resin molded part, which abuts on the seal ring, at a position farther from the front end of the valve housing while securing the necessary length of the portion of the resin molded part covering the magnetic cylindrical body, whereby the projecting amount of the valve housing from the receiving portion of the passage forming member can be made long, the exposed length of the valve housing to the intake passage side is made larger without increasing the electromagnetic fuel injection valve in size, and attachment of the injection fuel to the inner surface of the intake passage can be more effectively suppressed.

The above-mentioned object, other objects, features and advantages of the present invention will become apparent from a preferred embodiment, which will be described in detail below by reference to the attached drawings.

BRIEF DESCRIPTION OF THE DRAWINGS

FIG. 1 is a longitudinal sectional view showing a mounting state of an electromagnetic fuel injection valve to a throttle body.

FIG. 2 is a longitudinal sectional view of the electromagnetic fuel injection valve.

FIG. 3 is a view showing a formation process of a coil case.

DESCRIPTION OF THE PREFERRED EMBODIMENTS

Figure 1:
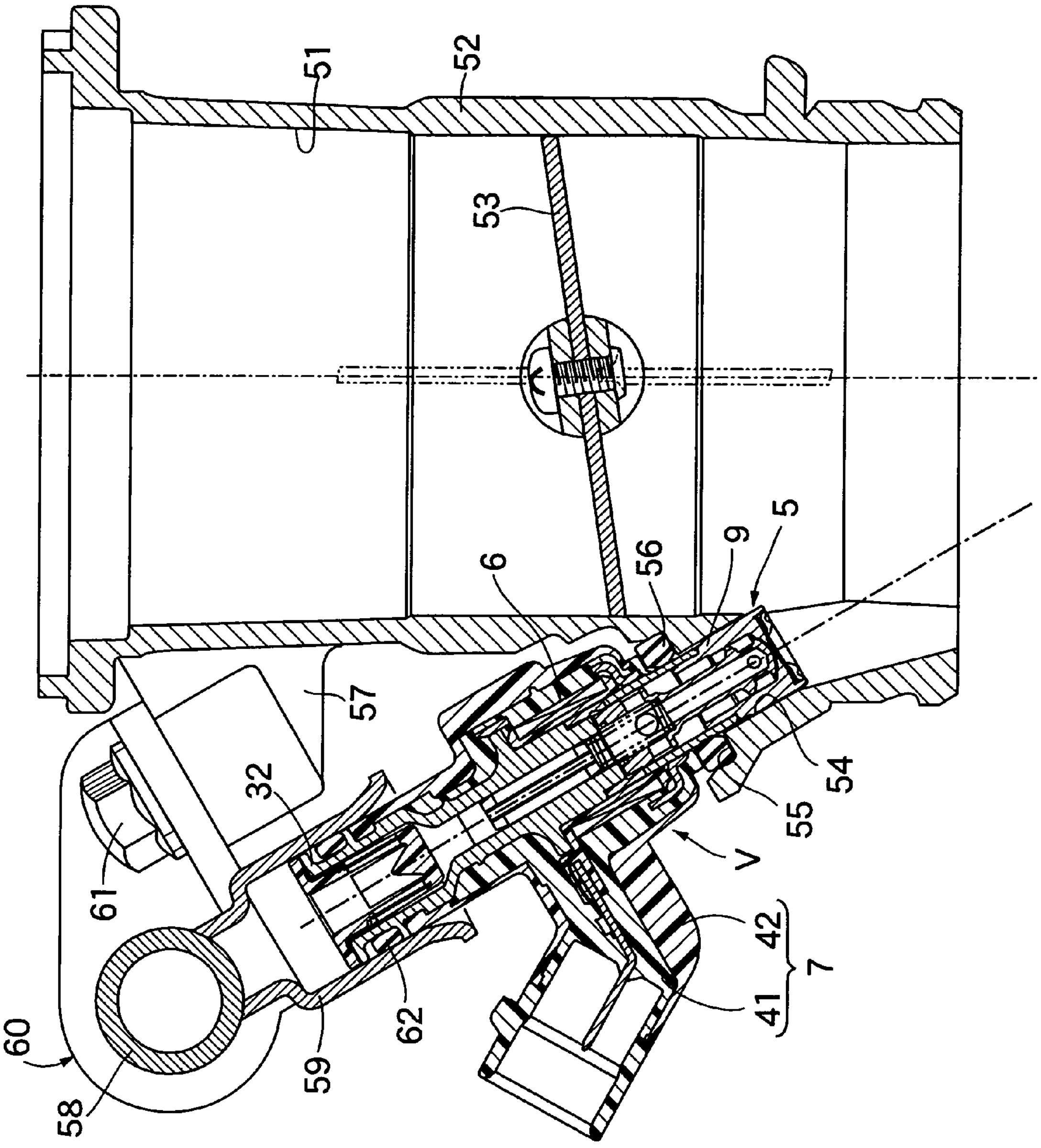
FIGS. 1 to 3 show one embodiment of the present invention.

One embodiment of the present invention will be described with reference to FIGS. 1 to 3. Referring first to FIG. 1, an electromagnetic fuel injection valve V of the present invention is mounted to a throttle body 52 that is a passage forming member for forming an intake passage 51. The throttle body 52 is provided with a mounting hole 54 which opens to an inner surface of the intake passage 51 at a downstream side from a throttle valve 53 which controls an opening degree of the intake passage 51, thereby forming an annular receiving part 55 at its external open end. A seal ring 56 sandwiched between the receiving part 55 and a resin molded part 7 is fitted to a valve housing 9 in the electromagnetic fuel injection valve V. A front portion of the valve housing 9 is fitted into the mounting hole 54 via the seal ring 56 sandwiched between the valve housing 9 and the mounting hole 54. A fuel distribution pipe 60 including a main pipe 58 and a plurality of branch pipes 59 is mounted to a bracket 57 provided at the throttle body 52 with a bolt 61. An O-ring 62 is fitted on an outer periphery of a rear portion of an inlet cylinder 32 which is provided at a rear portion of the electromagnetic fuel injection valve V. The branch pipes 59 of the fuel distribution pipe 60 are liquid-tightly fitted to the rear portion of the inlet cylinder 32 via the O-ring 62.

Figure 2:
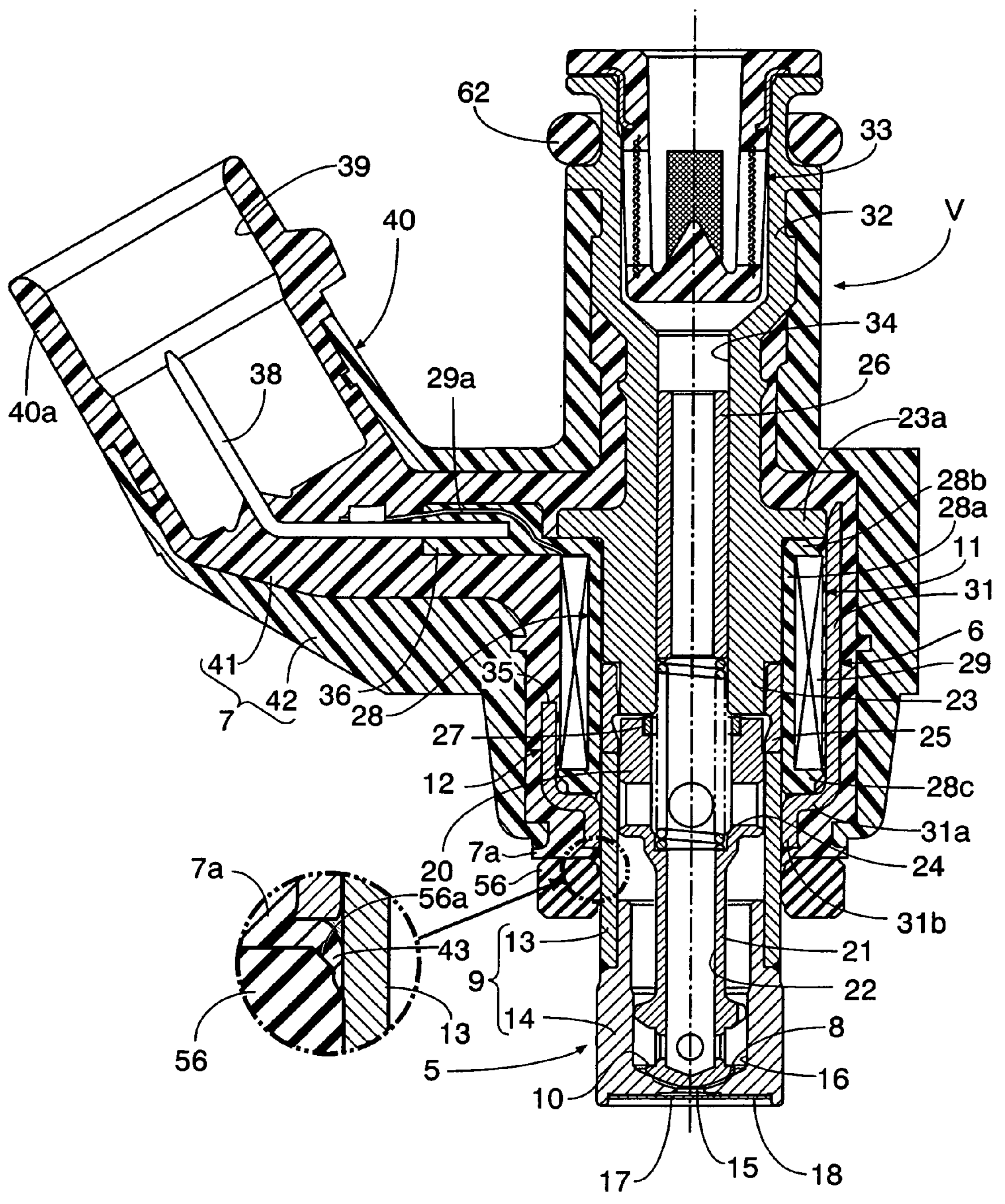

In FIG. 2, the electromagnetic fuel injection valve V includes: a valve operating part 5 in which a valve body 10 biased by a spring in a direction to be seated on a valve seat 8 is housed in the valve housing 9 having the valve seat 8 at a front end portion; a solenoid part 6 in which a coil assembly 11 capable of exhibiting an electromagnetic force for driving the valve body 10 to a side away from the valve seat 8 is housed in a solenoid housing 12 connected to the valve housing 9; and a resin molded part 7 made of a synthetic resin, which integrally has a power receiving coupler 40 that faces power-receiving-side connecting terminals 38 connected to the coil 29 of the coil assembly 11 and that covers at least the solenoid part 6.

The valve housing 9 comprises a magnetic cylindrical body 13 made of magnetic metal, and a valve seat member 14 which is fluid-tightly connected to a front end of the magnetic cylindrical body 13. The valve seat member 14 is welded to the magnetic cylindrical body 13 with its rear end portion fitted to a front end portion of the magnetic cylindrical body 13. The valve seat member 14 is coaxially provided with a fuel outlet port 15 opened to a front end surface of the valve seat member 14, the tapered valve seat 8 connected to an inner end of the fuel outlet port 15, and a guide hole 16 connected to a rear end large diameter portion of the valve seat 8. An injector plate 18 of a steel plate having a plurality of fuel injection holes 17 communicating with the fuel outlet port 15 is fluid-tightly welded to a front end of the valve seat member 14 along its entire periphery.

A movable core 20 constituting a part of the solenoid part 6 is slidably fitted to a rear portion within the valve housing 9. The valve body 10 capable of closing the fuel outlet port 15 by sitting on the valve seat 8 is integrally formed at a front end of a valve shaft 21 integrally connecting to the movable core 20. A through-hole 22 formed into a bottomed shape with its front end closed and leading into the valve housing 9 is formed coaxially in the movable core 20, the valve shaft 21 and the valve body 10.

The solenoid part 6 includes: the movable core 20; a cylindrical fixed core 23 opposed to the movable core 20; a return spring 24 which exhibits a spring force biasing the movable core 20 to a side away from the fixed core 23; the coil assembly 11 which is disposed to surround the rear portion of the valve housing 9 and the fixed core 23 while being capable of exhibiting the electromagnetic force which attracts the movable core 20 toward the fixed core 23 against the spring force of the return spring 24; and the solenoid housing 12 which encloses the coil assembly 11 so that its front end portion is connected to the valve housing 9.

A rear end of the magnetic cylindrical body 13 in the valve housing 9 is coaxially connected to a front end of the fixed core 23 via a non-magnetic cylindrical body 25 made of non-magnetic metal. The rear end of the magnetic cylindrical body 13 is butt-welded to a front end of the non-magnetic cylindrical body 25. A rear end of the non-magnetic cylindrical body 25 is welded to the fixed core 23 with the front end portion of the fixed core 23 fitted to the non-magnetic cylindrical body 25.

A cylindrical retainer 26 is fitted to the fixed core 23 and fixed by crimping. The return spring 24 is interposed between the retainer 26 and the movable core 20. In order to avoid the movable core 20 from directly contacting the fixed core 23, a ring-shaped stopper 27 made of a non-magnetic material is fitted and fixed to an inner periphery of the rear end portion of the movable core 20 so as to slightly project toward the fixed core 23 from the rear end surface of the movable core 20. Further, the coil assembly 11 is formed by winding a coil 29 around a bobbin 28 which surrounds the rear portion of the valve housing 9, the non-magnetic cylindrical body 25 and the fixed core 23.

The solenoid housing 12 comprises a cylindrical coil case 31 made of magnetic metal and a flange portion 23*a*. The cylindrical coil case 31 has, at its one end, a ring-shaped end wall 31*a* and surrounds the coil assembly 11, and the flange portion 23*a* protruding radially outward from the rear end portion of the fixed core 23 to oppose the end portion of the coil assembly 11 at a side opposite from the valve operating part 5. The flange portion 23*a* is magnetically connected to the other end portion of the coil case 31. In addition, a fitting cylindrical portion 31*b* to which the magnetic cylindrical body 13 in the valve housing 9 is press-fitted is coaxially and integrally provided at an inner periphery of the end wall 31*a* in the coil case 31. The coil case 31, that is, the solenoid housing 12 is connected to the valve housing 9 by welding the fitting cylindrical portion 31*b* to the outer periphery of the magnetic cylindrical body 13.

Figure 3:
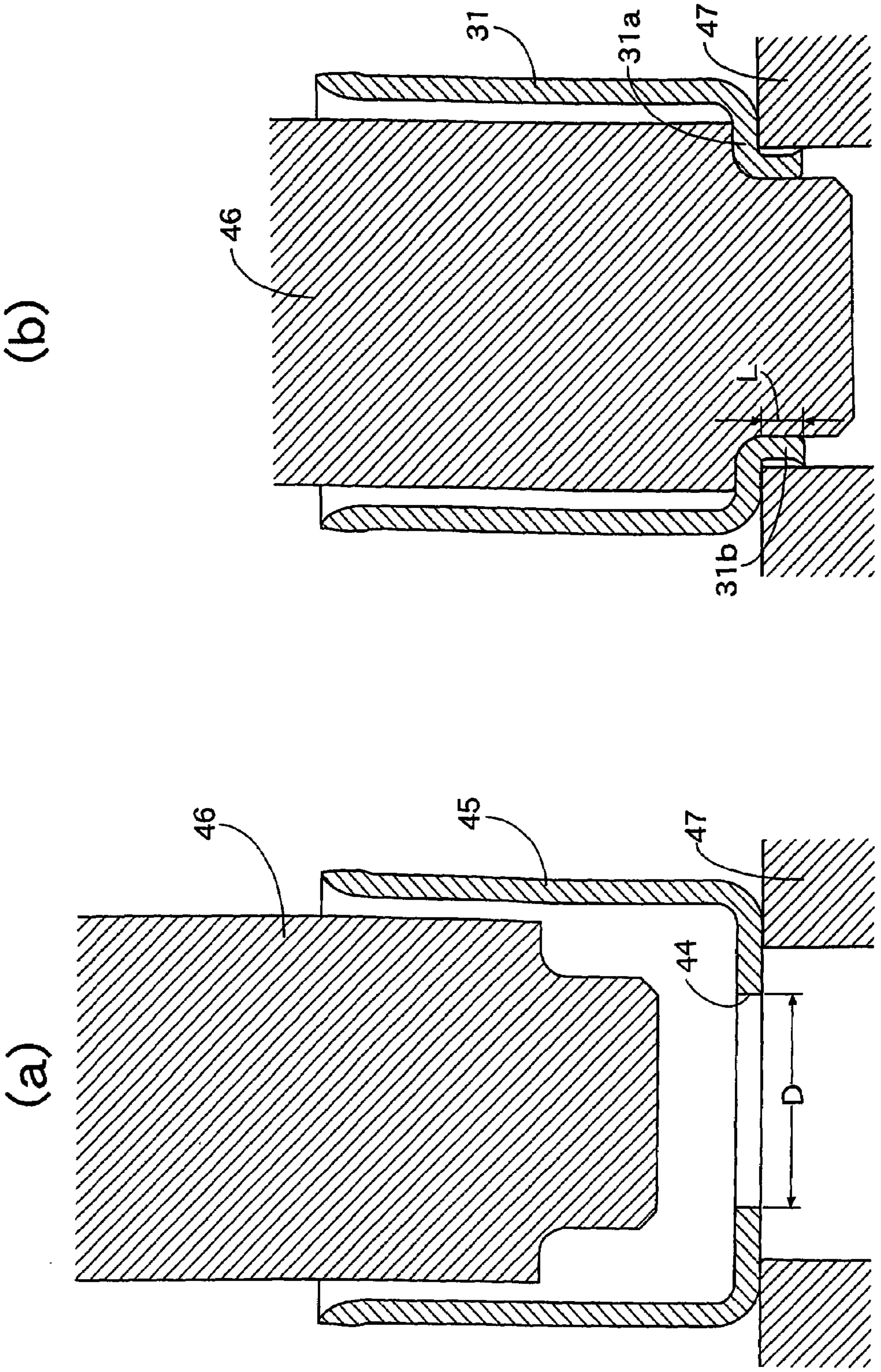

In forming the coil case 31, a magnetic metal cylindrical bottomed material 45 which has a circular open portion 44 having a diameter smaller than an outer diameter of a press-fit cylindrical portion 31*b* in a central part of a closed end is prepared as shown in FIG. 3(*a*), and a burring process by a punch 46 and a die 47 is applied to the central portion of the closed end of the material 45, whereby the coil case 31 is obtained as shown in FIG. 3(*b*).

Figure 4:
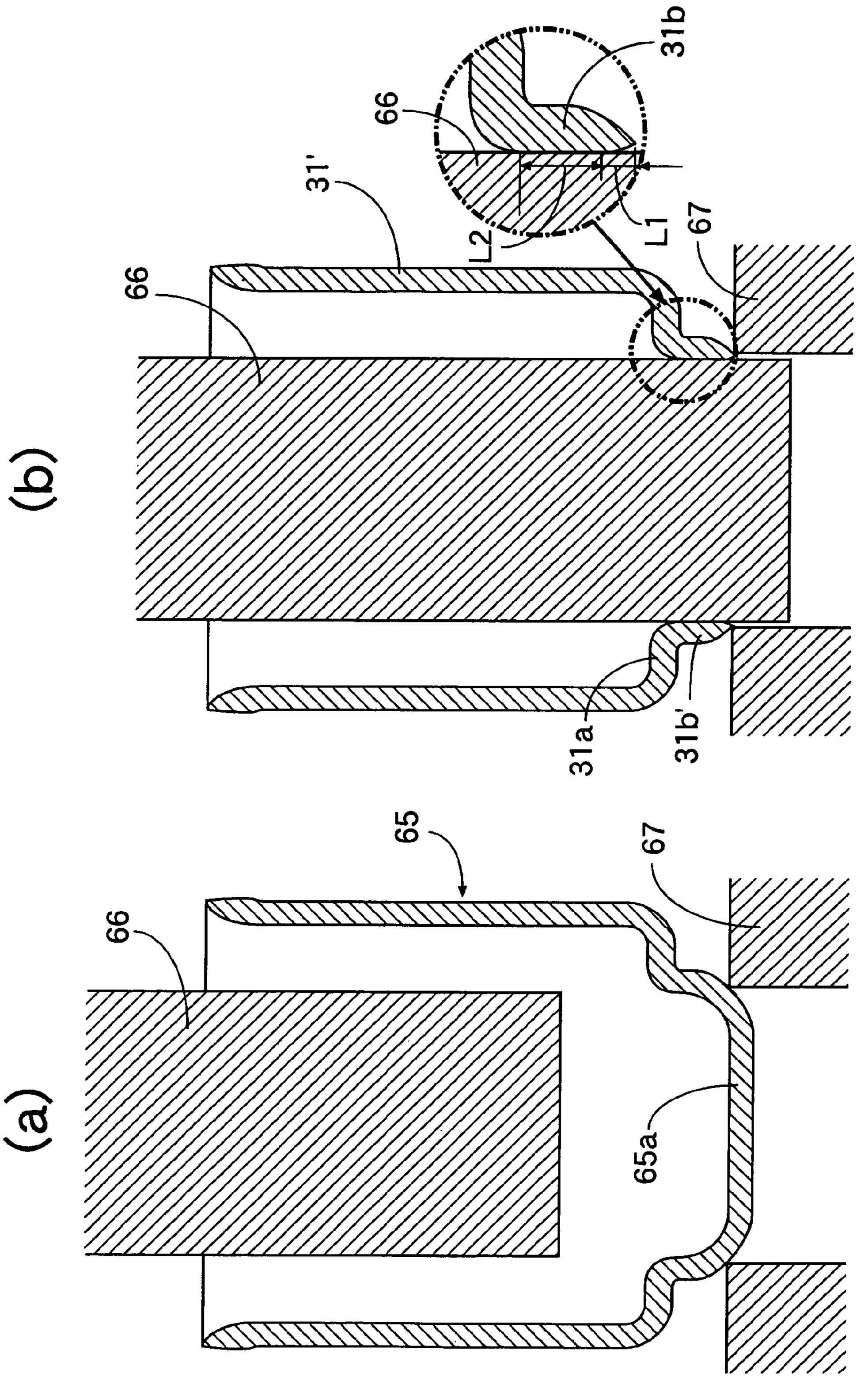
FIG. 4 is a view showing a formation process of a conventional coil case.

According to such a burring process, the proportion of a length L of a portion having a constant inner diameter of the press-fit cylindrical portion 31*b* in the entire length of the press-fit cylindrical portion 31*b* can be made larger as compared with the press-fit cylindrical portion 31*b*' formed by the conventional punching described above with reference to FIG. 4. When a length of a predetermined amount or more in close contact with the outer periphery of the magnetic cylindrical body 13 is set as the length L, the entire length of the press-fit cylindrical portion 31*b* can be made smaller as compared with the entire length of the press-fit cylindrical portion 31*b*' formed by the conventional punching.

Again in FIG. 2, the cylindrical inlet cylinder 32 made of metal such as stainless steel is integrally and coaxially connected to the rear end of the fixed core 23. A fuel filter 33 is mounted to a rear portion of the inlet cylinder 32. In addition, a fuel passage 34 leading to a through-hole 21 of the movable core 20 is coaxially provided in the inlet cylinder 32, the retainer 26 and the fixed core 23.

The resin molded part 7 is formed so as to sealingly imbed therein not only the solenoid housing 12 and the coil assembly 11 but also a part of the valve housing 9 and most part of the inlet cylinder 32, while filling a gap between the solenoid housing 12 and the coil assembly 11. The coil case 31 of the solenoid housing 12 is provided with a notched portion 35 for disposing a terminal boss portion 36, which is integrally formed at the bobbin 28 of the coil assembly 11, at an outside of the solenoid housing 12.

The resin molded part 7 is integrally provided with the power receiving coupler 40 forming a recessed portion 39 which faces the power-receiving-side connecting terminals 38 connecting to opposite ends of the coil 29 in the coil assembly 11. Base ends of the power-receiving-side connecting terminals 38 are imbedded in the terminal boss portion 36. Coil ends 29*a* of the coil 29 are electrodeposited to the power-receiving-side connecting terminals 38.

The resin molded part 7 is formed by molding two layers, that is, a first resin molded layer 41 which covers at least a part of the solenoid housing 12 and forms a coupler main portion 40*a* forming a basic structure of the power receiving coupler 40, and a second resin molded layer 42 which covers the first resin molded layer 41 so that an outer periphery of the power receiving coupler 40 is exposed from an intermediate portion to a tip end side of the power receiving coupler 40. In this embodiment, the entire part of the solenoid housing 12, the rear part of the valve housing 9 and a part of the inlet cylinder 32 are covered with the first resin molded layer 41, and the coupler main portion 40*a* of the power receiving coupler 40 is formed by the first resin molded layer 41.

In addition, the first and the second resin molded layers 41 and 42 are made of different synthetic resins. While the first resin molded layer 41 is made of a synthetic resin having a relatively large bending strength, the second resin molded layer 42 is made of a synthetic resin with a bending strength smaller than that of the first resin molded layer 41. The first resin molded layer 41 is made of, for example, a liquid crystal polymer containing glass fiber. The second resin molded layer 42 is made of a thermoplastic polyester elastomer excluding glass fiber, for example, an elastomer under the trade name of Hytrel (produced by Du Pont de Nemours & Company Inc.).

The liquid crystal polymer containing glass fiber which forms the first resin molded layer 41 has a high rigidity and a function of relatively suppressing transmission of operation sound. On the other hand, the second resin molded layer 41 is made of the thermoplastic polyester elastomer excluding glass fiber can suppress the operation sound pressure peak to be low.

The resin molded part 7 is provided with a forward extending portion 7*a* which extends forward from the solenoid housing 12 while covering the magnetic cylindrical body 13. The rind-shaped seal ring 56 surrounding the magnetic cylindrical body 13 is sandwiched between a front end of the forward extending portion 7*a* and the receiving portion 55 of the throttle body 52. Taper surfaces 56*a* are formed at least on an end portion of an inner periphery of the seal ring 56, which is at the resin molded part 7 side, that is, at opposite end portions of the inner periphery in this embodiment. A tapered projecting portion 43, which is inserted between the magnetic cylindrical body 13 and the taper surface 56*a* at the resin molded part 7 side among both the taper surfaces 56*a*, is integrally provided at the first resin molded portion 41 in the resin molded part 7 so as to cover the magnetic cylindrical body 13 while projecting forward from the inner peripheral portion of the forward extending portion 7*a*.

Next, the operation of the embodiment will be described. The burring process to the central portion of the closed end of the bottomed cylindrical material 45 having the circular opening 44 with a smaller diameter than the outer diameter of the press-fit cylindrical portion 31*b*, provides the cylindrical magnetic metal coil case 31 which integrally has, at one end side, the ring-shaped end wall portion 31*a* and the press-fit cylindrical portion 31*b* integrally connected to the inner periphery of the end wall portion 31*a* so that the magnetic cylindrical body 13 is press-fitted to the press-fit cylindrical portion 31*b* and the press-fit cylindrical portion 31*b* is welded to the magnetic cylindrical body 13. Therefore, the press-fit cylindrical portion 31*b* of the coil case 31 is formed to have the close contact length of the outer surface of the magnetic cylindrical body 13 longer than that obtained by punching, and the length of the press-fit cylindrical portion 31*b* can be made shorter than that obtained by punching. Thus, the projecting amount of the valve housing 9 from the resin molded part 7 can be made long, the exposed length of the valve housing 9 to the intake passage 51 side is made long without increasing the electromagnetic fuel injection valve V in size, and attaching of injection fuel to the inner surface of the intake passage 51 can be suppressed.

The resin molded part 7 is provided with the forward extending portion 7*a* which extends forward from the solenoid housing 12 while covering the magnetic cylindrical body 13. The tapered projecting portion 43 is integrally provided at the resin molded part 7 to cover the magnetic cylindrical body 13 while projecting forward from the inner peripheral portion of the forward extending portion 7*a*. The tapered projecting portion 43 is inserted between the magnetic cylindrical body 13 and the taper surface 56*a* which is formed on at least an end portion at the resin molded part 7 side of the inner periphery of the ring-shaped seal ring 56 that is sandwiched between an annular receiving portion 55 provided at the passage forming member 52 forming the intake passage 51 and the front end of the forward extending portion 7*a* and that surrounds the magnetic cylindrical body 13.

Accordingly, it is possible to dispose the portion of the resin molded part 7 which abuts on the seal ring 56 at a position farther from the front end of the valve housing 9 while securing necessary length of the portion of the resin molded part 7 for covering the magnetic cylindrical body 13. Therefore, the projecting amount of the valve housing 9 from the receiving portion 55 of the throttle body 52 can be made long, the exposed length of the valve housing 9 to the intake passage 51 side is made longer without increasing the electromagnetic fuel injection valve V in size, and attachment of the injection fuel to the inner surface of the intake passage 51 can be more effectively suppressed.

The embodiment of the present invention is described thus far, but the present invention is not limited to the above described embodiment, and various design changes can be made without departing from the present invention described in claims.

What is claimed is:

1. An electromagnetic fuel injection valve comprising:

a magnetic cylindrical body which defines a part of a valve housing having a valve seat at a front end portion;

a cylindrical fixed core connected at a front portion thereof to the magnetic cylindrical body via a coaxial non-magnetic cylindrical body;

a solenoid housing including a cylindrical magnetic metal coil case integrally having, at one end side, a ring-shaped end wall portion and a press-fit cylindrical portion integrally connected to an inner periphery of the end wall portion wherein the magnetic cylindrical body is press-fitted to the press-fit cylindrical portion and the press-fit cylindrical portion is welded to the magnetic cylindrical body, and a flange portion which protrudes radially outward from a rear end of the fixed core and is directly connected to the other end of the coil case;

a coil assembly surrounding a rear portion of the magnetic cylindrical body, the non-magnetic cylindrical body and the fixed core, wherein the coil assembly is housed in the solenoid housing; and a resin molded part covering at least the solenoid housing, wherein the resin molded part is made of a synthetic resin and integrally includes a power receiving coupler which faces a power-receiving-side connecting terminal connected to a coil of the coil assembly, wherein the coil case is formed by a burring process to a central portion of a closed end of a bottomed cylindrical material having a circular opening with a smaller diameter than an outer diameter of the press-fit cylindrical portion.

2. The electromagnetic fuel injection valve according to claim 1, wherein the resin molded part is provided with a forward extending portion which extends forward from the solenoid housing while covering the magnetic cylindrical body, and that a tapered projecting portion, which is integrally provided at the resin molded part to cover the magnetic cylindrical body while projecting forward from the inner peripheral portion of the forward extending portion, is inserted between the magnetic cylindrical body and a taper surface formed on at least an end portion at the resin molded part side of an inner periphery of a ring-shaped seal ring sandwiched between an annular receiving portion provided at a passage forming member forming an intake passage and a front end of the forward extending portion and which surrounds the magnetic cylindrical body.

3. The electromagnetic fuel injection valve according to claim 1, wherein the magnetic cylindrical body has a uniform outer diameter along an entire length thereof.

4. The electromagnetic fuel injection valve according to claim 1, wherein the resin molded part directly contacts and engages the solenoid housing.

5. An electromagnetic fuel injection valve comprising:

a magnetic cylindrical body which defines a part of a valve housing having a valve seat at a front end portion;

a cylindrical fixed core connected at a front portion thereof to the magnetic cylindrical body via a coaxial non-magnetic cylindrical body;

a solenoid housing including a cylindrical magnetic metal coil case integrally having, at one end side, a ring-shaped end wall portion and a press-fit cylindrical portion integrally connected to an inner periphery of the end wall portion wherein the magnetic cylindrical body is press-fitted to the press-fit cylindrical portion and the press-fit cylindrical portion is welded to the magnetic cylindrical body, and a flange portion which protrudes radially outward from a rear end of the fixed core and is magnetically connected to the other end of the coil case;

a coil assembly surrounding a rear portion of the magnetic cylindrical body, the non-magnetic cylindrical body and the fixed core, wherein the coil assembly is housed in the solenoid housing; and a resin molded part covering at least the solenoid housing, wherein the resin molded part is made of a synthetic resin and integrally includes a power receiving coupler which faces a power-receiving-side connecting terminal connected to a coil of the coil assembly, wherein the coil case is formed by a burring process to a central portion of a closed end of a bottomed cylindrical material having a circular opening with a smaller diameter than an outer diameter of the press-fit cylindrical portion, wherein the resin molded part is provided with a forward extending portion which extends forward from the solenoid housing while covering the magnetic cylindrical body, and that a tapered projecting portion, which is integrally provided at the resin molded part to cover the magnetic cylindrical body while projecting forward from the inner peripheral portion of the forward extending portion, is inserted between the magnetic cylindrical body and a taper surface formed on at least an end portion at the resin molded part side of an inner periphery of a ring-shaped seal ring sandwiched between an annular receiving portion provided at a passage forming member forming an intake passage and a front end of the forward extending portion and which surrounds the magnetic cylindrical body.

6. The electromagnetic fuel injection valve according to claim 5, wherein the magnetic cylindrical body has a uniform outer diameter along an entire length thereof.

7. The electromagnetic fuel injection valve according to claim 5, wherein the resin molded part directly contacts and engages the solenoid housing.

* * * * *